United States Patent [19]

Kurth et al.

[11] Patent Number: 4,790,970

[45] Date of Patent: Dec. 13, 1988

[54] PROCESS FOR THE MANUFACTURE OF A LAUNCHING TUBE FOR MISSILES

[75] Inventors: Josef Kurth, Troisdorf-Spich; Christoph Mathey, Ockenfels; Waldemar Wissinger, Siegburg, all of Fed. Rep. of Germany

[73] Assignee: Dynamit Nobel AG, Troisdorf, Fed. Rep. of Germany

[21] Appl. No.: 896,877

[22] Filed: Aug. 15, 1986

Related U.S. Application Data

[60] Division of Ser. No. 731,015, May 6, 1985, Pat. No. 4,646,618, which is a continuation of Ser. No. 481,939, Apr. 4, 1983, abandoned.

[30] Foreign Application Priority Data

Apr. 5, 1982 [DE] Fed. Rep. of Germany ....... 3212721

[51] Int. Cl.$^4$ .................... B29C 47/20; B29C 47/94
[52] U.S. Cl. .................... 264/130; 264/173; 264/174; 264/177.17; 264/177.2; 264/209.2; 264/209.4; 264/339

[58] Field of Search ................ 264/209.2, 209.4, 295, 264/280, 339, 177.14, 177.17, 209.1, 210.2, 210.3, 209.3, 209.5, 167, 150, 151, 130, 177, 177.2; 138/177, 178, DIG. 7

[56] References Cited

U.S. PATENT DOCUMENTS

| | | | |
|---|---|---|---|
| 1,876,444 | 9/1932 | Babb | 264/295 |
| 2,687,997 | 8/1954 | Marchand | 264/177.14 |
| 3,441,637 | 4/1969 | Davis | 264/295 |
| 3,673,916 | 7/1972 | Wittholz | 89/1.816 |
| 3,944,641 | 3/1976 | Lemelson | 264/150 |
| 4,152,380 | 5/1979 | Graves et al. | 264/209.4 |

Primary Examiner—Jan H. Silbaugh
Assistant Examiner—Hubert C. Lorin
Attorney, Agent, or Firm—Antonelli, Terry & Wands

[57] ABSTRACT

A process for the manufacture of a launching tube with an internal guide surface for effecting controlled spin missiles, such as rockets, wherein the launching tube is provided on the inside with helically extending grooves and/or ridges contacting guide cams or the like of the missiles for guiding therealong; this launching tube is extruded, and sized, from a molding composition containing fiber-reinforced thermoplastic synthetic resin, to have integrally formed, slightly helically extending grooves and/or ridges.

11 Claims, 8 Drawing Sheets

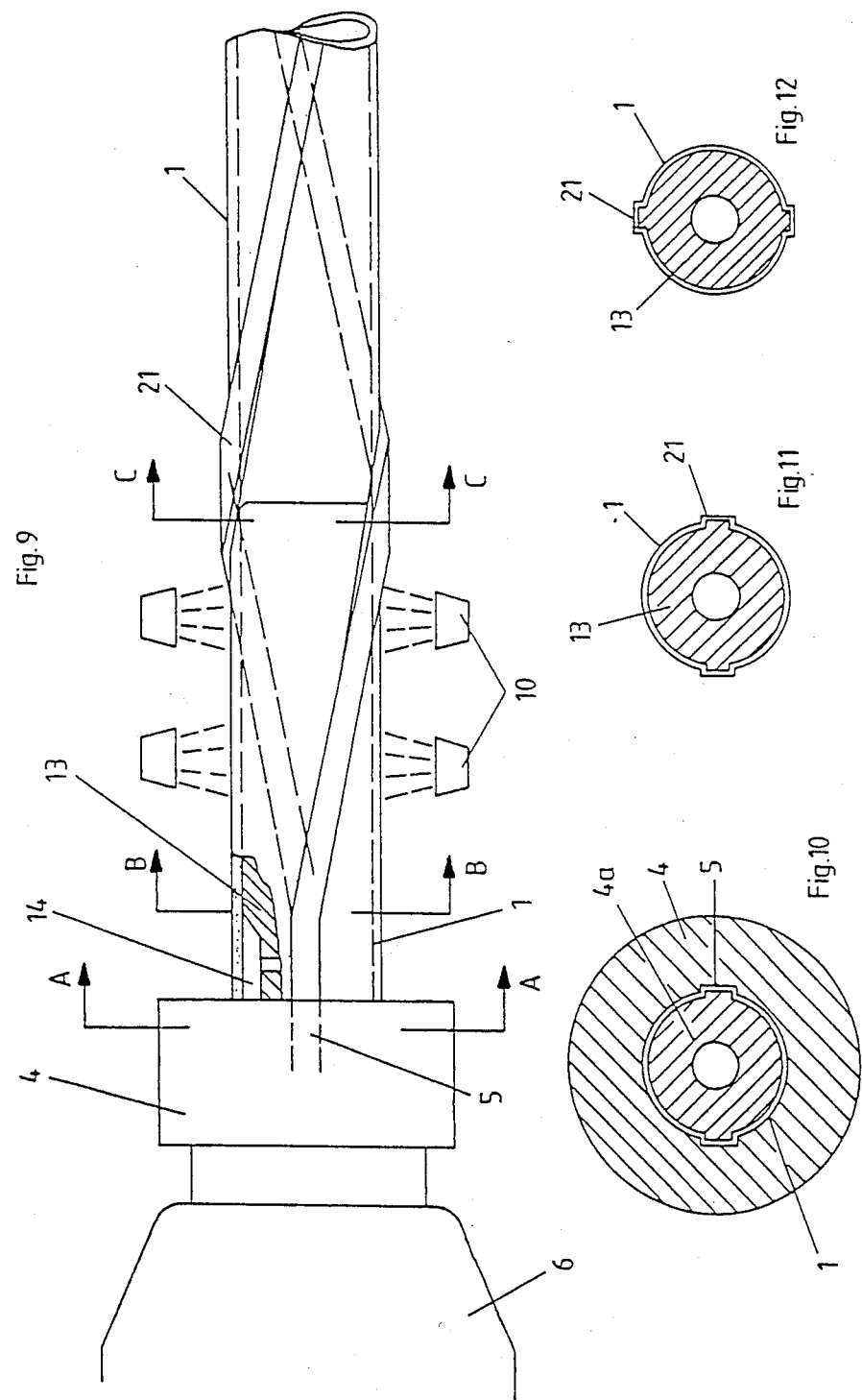

PROCESS FOR THE MANUFACTURE OF A LAUNCHING TUBE FOR MISSILES

This is a divisional of application Ser. No. 731,015, filed May 6, 1985, now U.S. Pat. No. 4,646,618, which is a continuation of application Ser. No. 481,939, filed Apr. 4, 1983, now abandoned.

This invention relates to a launching tube with a device for controlling the spin or rotation of missiles, such as rockets, wherein the launching tube is provided on the inside wall with guidance means such as helically extending grooves and/or ridges for contacting guide cams or the like of the missiles for guiding therealong and to a process for producing the launching tube.

Launching tubes with controlled spin for rockets equipped preferably with a folded stabilizer design are known, for example, from DOS [German Unexamined Laid Open Application] 1,703,248; in this arrangement, the tube has helically extending grooves on the inside engaged by guide pins of the rocket, which pins project beyond the caliber of the missile and the launching tube, as a thin-walled tube of constant wall thickness, is provided besides the grooves accommodating the pins of the rocket, with an additional thickness of drawn metal extending in the longitudinal extension of the tube. Such launching tubes must withstand high stresses. However, these tubes are to occupy a minimum of space since they are combined into clusters in various numbers on a mount and thus also represent a considerable weight and require a large amount of space.

Missiles, preferably ballistic rockets, are stabilized during the flight phase by stabilizer surfaces primarily mounted in the zone of the rocket nozzle and known as tail units.

Starting devices for such missiles are designed, especially in case of a military equipment, for the simultaneous or delayed, interval-type start of several rockets. In order to keep the constructional volume of such starting devices at a minimum as related to the missiles to be launched therefrom, the missile stabilizer surfaces are folded into the missile caliber, i.e., into the body of the rocket, in the starting position so that the missile can be launched or fired from a launching tube, the internal diameter of which is approximately equal to the missile caliber.

In order to eliminate the effect of structural faults of the missile during the ballistic flight phase, a spin is forcibly imparted to the exiting missile within the launching tube. This is frequently accomplished by providing that guide elements, for example, pins, arranged on the missile and projecting beyond the missile caliber engage, on the side of the launching tube, into guide grooves worked into the wall of the launching tube with a greater or lesser extent of twist.

Furthermore, launching tubes of metal are conventional, wherein such guide grooves are provided, after the tube blank has been manufactured, in the wall of the tube by metal-cutting processes or by a non-cutting shaping step.

All of these aforementioned manufacturing methods are discontinuous, i.e., the respectively manufactured length is equal to or slightly longer than the length of the launching tube. However, continuous manufacturing processes are substantially more economical than discontinuous processes.

The invention is based on the object of providing a launching tube for missiles producible in a continuous process, this tube being maximally lightweight and yet satisfying the requirements to be met by a rocket launching tube.

This invention achieves the above object by providing a launching tube characterized in that the tube is extruded, and sized, from a molding composition based on, an especially, fiber-reinforced thermoplastic synthetic resin with integrally formed, helically extending grooves and/or ridges.

It has been found according to the invention that it is possible to extrude nonreinforced and fiber-reinforced molding compositions not only, as is conventional, into tubes, but it is also possible to extrude such compositions into the desired launching tubes with helically extending grooves and/or ridges producible in the desired way by direct, integral molding during the extrusion and sizing steps. As a result not only a lightweight, highly stressable launching tube for the desired purpose is obtained, but simultaneously a continuous, very economical process for the manufacture of launching tubes, as compared with the prior art is achieved.

Preferably suitable for forming the launching tubes are glass fiber-reinforced molding compositions containing, per 100 parts by weight of thermoplastic synthetic resin, especially resins such as nonplasticized PVC, polyolefins, ethylene copolymers, polypropylene and polypropylene copolymers, polyamides, polybutene, fluorine-containing polymers, such as polyvinylidene fluoride, polyvinyl fluoride, polytetrafluoroethylene, ethylene-tetrafluoroethylene, copolymers, impact-resistant polystyrenes, such as SAN [styrene-acrylonitrile copolymers], ABS [acylonitrile-butadiene-styrene copolymers], polyphenylene oxides, polyphenylene sulfides, polyoxymethylenes, polycarbonates, polyethylene terephthalates, polybutylene terephthalates, etc., 10–150 parts by weight of glass fibers, other inorganic fillers and/or carbon fibers, as well as other additives.

Glass-reinforced thermoplastics can be produced and utilized also according to this invention by two different processes. In one process, glass fiber strands are impregnated with a melt of the thermoplastic and, after solidification, the strands are chopped into a granulated material. The granulated material is then further extruded to obtain the desired launching tubes. In the other process, the thermoplastic is mixed in powder form with the glass fibers, which fibers have been cut into short lengths or pieces and the mixture is directly extruded.

Preferably, 30–100 parts by weight of glass fibers are employed per 100 parts by weight of thermoplastic synthetic resin; the diameter of the glass fibers is 2–25 $\mu$m with a length of up to maximally 12 mm.

A preferred molding composition for producing the launching tubes extruded in accordance with the invention contains, per 100 parts by weight of polyvinyl chloride having a K-value of between 55 and 75, 40–80 parts by weight of glass fibers having a diameter of 5–25 $\mu$m with a length of 0.5–12 mm, and 0–15 parts by weight of a pulverulent mineral filler having an average particle diameter of below 50 $\mu$m, and 2.5–5.0 parts by weight of a mold release agent, and up to 30 parts by weight of modifiers such as ethylene/vinyl acetate copolymers, acrylatepolymers, chlorinated polyethylene, acrylonitrile/butadiene/styrene, methacry/conitrile/butadiene/styrene, or the like.

In this connection, the term "polyvinyl chloride" is understood to include polyvinyl chloride, polyvinylidene chloride, postchlorinated polyvinyl chloride, and the copolymers obtained from a chlorinated vinyl monomer and at least one monomer copolymerizable therewith.

The mineral fillers suitable for the compositions of this invention are preferably precipitated or unprecipitated calcium carbonates, colloidal silicic acids, hydrated aluminas, calcined clays, and aluminosilicates.

Examples for suitable mold release agents are fatty acids and fatty alcohols, esters thereof, paraffin waxes, and oxidized or non-oxidized high molecular weight polyethylene waxes. Further additives are pigments, colorants, thermal stabilizers, antioxidants, ultraviolet absorbers, flame retardants, etc.

The glass fibers employed are preferably treated with adhesion-promoting bonding agents, especailly organofunctional silane adhesion promoters. In this connection, aminosilanes are provided, in particular, for thermoplastics and acrylic resins; epoxy silanes when using polyamides, polyurethanes, polysulfides; and vinyl silanes for EPDM elastomers, etc.

As compared with conventional methods, it is advantageous that the launching tube of this invention can be extruded with constant wall thickness, the internal guide means, e.g. grooves, being integrally formed. However, it is also possible to fashion the launching tube with constant wall thickness and, in the zone of the guide ridges, thickened by such ridges. With an inner diameter of the launching tubes of between 50 and 350 mm and with a length of up to 5 m, wall thicknesses are preferred of between 1 and 15 mm.

The invention makes it possible to size the launching tubes on the inside and/or on the outside. However, it is also possible, in another mode of operation, to size the launching tube on the inside and/or outside optionally only over partial areas. The launching tube of this invention is unique in that the extruded and sized molding composition, in the longitudinal extension of the launching tube is oriented corresponding to the helical configuration of the internal guide means for imparting the axial spin in the longitudinal direction, whereby the strength properties of the tube, in total, are likewise improved.

The process of this invention for the manufacture of launching tubes from thermoplastic molding compositions is distinguished in that the launching tube is extruded from a plasticized, preferably fiber-reinforced thermoplastic molding composition and sized on the inside and/or outside, the grooves and/or ridges being formed in the launching tube within the extrusion die in parallel to the flow direction in the longitudinal axis of the launching tube, and exiting from the extrusion die in a direction in parallel to the longitudinal axis. Thereafter, the grooves and/or ridges are provided with an axial twist while being pulled through a sizing device; the thus-sized launching tube thereby leaves the sizing device while revolving within the device. It has been found that the synthetic resin composition extruded from the extrusion die with contours extending in parallel to the longitudinal axis of the tube (as well as the longitudinal axis of the device), the composition flowing in parallel to the axis, yet has imparted thereto an axially running twist if the internal contours in the subsequent sizing tool exhibit a corresponding twist which is transferred by these internal contours to the tube. Thus, a continuous manufacture of launching tubes with grooves or guide ridges exhibiting a slight twist sufficient for imparting spin to a missile has been made possible.*

*The continuously extruded tubular element is cut after leaving the sizing device to the appropriate size, i.e. length of the launching tube, which may be up to 4 m length. The launching tube will be equipped in a usual manner with the missiles.

Since friction forces acting in the circumferential direction arise between the surface of the launching tube and, in particular, the surface of the sizing tool, it may be expedient, especially in case of relatively small angles of inclination of the spin grooves, to apply a lubricant to the inner and/or outer surface of the launching tube. This can be done either shortly upstream of the sizing tool, or also as early as within the extrusion die for forming the tube.

The rifling or helically extending grooves and/or ridges can be formed in the launching tube, for example, by providing the wall of the sizing device which calibrates the outside of the launching tube with at least one twisting groove or twisting ridge to guide the launching tube. Another possibility is to equip the means which size the inner surface of the launching tube, for example, a sizing mandrel with at least one groove or ridge to guide the launching tube and to produce the twist of the guide ridges and/or guide grooves. The essential aspect for the invention is that the grooves and/or ridges molded to the extruded launching tube in the zone of the extrusion die are provided with a corresponding twist in the still thermoelastic condition during the sizing and cooling steps in the sizing device.

The launching tube of this invention, produced from especially fiber-reinforced theremoplastic resins, can be manufactured, besides using the aforedescribed process, also by the pultrusion method, wherein the formation of the rifling-like grooves or guide ridges can be effected by a subsequently arranged sizing device, inner and/or outer sizing.

The invention will be described hereinafter with reference to the accompanying drawing showing several embodiments thereof, wherein:

FIG. 9 shows an extrusion arrangement, in a schematic view, with means for effecting internal sizing of the initially formed tube or preform;

FIG. 10 shows a cross section taken along line A—A through the die illustrated in FIG. 9;

FIG. 11 shows a cross section taken along line B—B through the internal caliber in the inlet zone according to FIG. 9;

FIG. 12 shows a cross section taken along line C—C through the internal caliber in the outlet zone according to FIG. 9;

Figure 1:
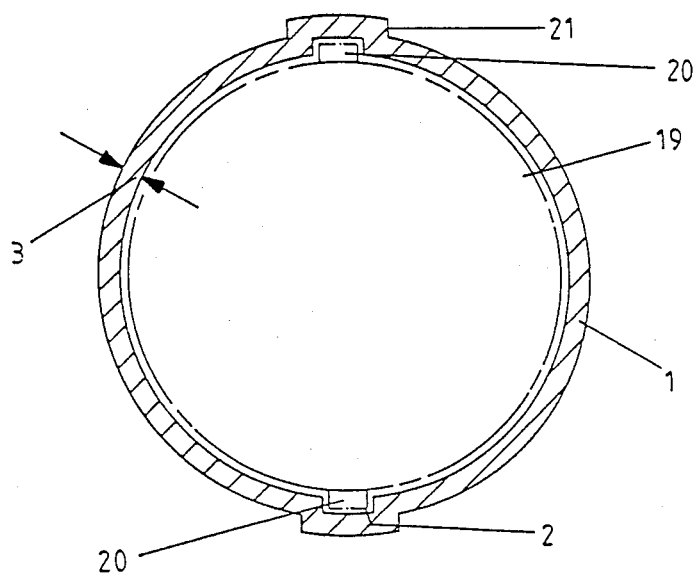
FIG. 1 shows, in cross-section, one possible configuration of a launching tube.
Figure 7:
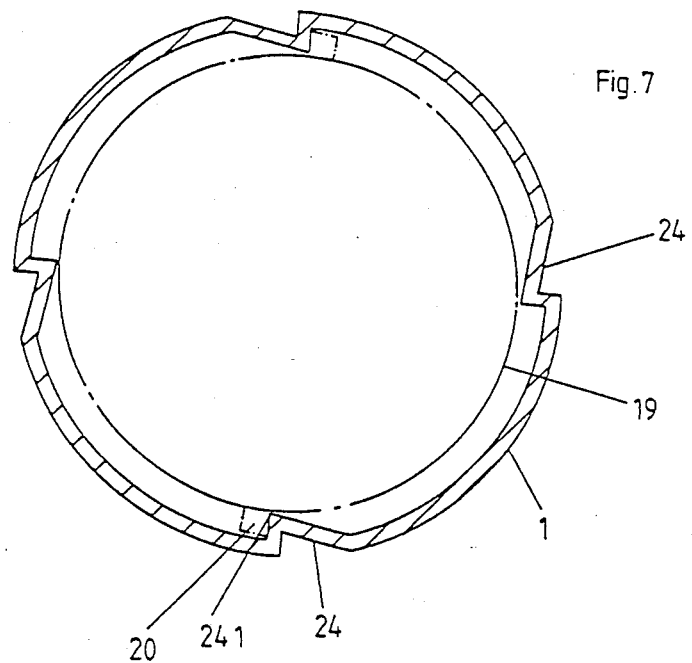
Figure 19:
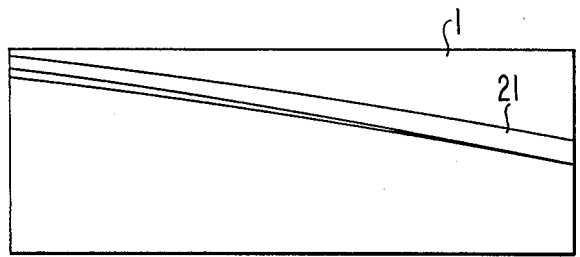
Figure 20:
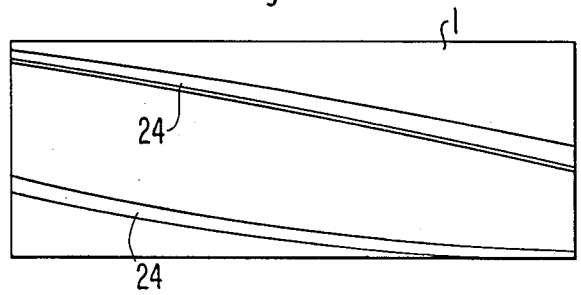

FIGS. 19 and 20, respectively, show longitudinal planed views of a launching tube having the cross-section shown, respectively, in FIGS. 1 and 7.

FIG. 1 shows the configuration of a launching tube in one embodiment. The launching tube 1, for example, extruded from glass-reinforced nonplasticized PVC, exhibits the helically extending grooves 2, integrally molded during extrusion, on the inside, the grooves being formed by a rib 21 molded on the outside. The inner diameter of the launching tube 1 is here only slightly larger than the outer diameter of the missile 19, indicated in dot-dash lines. Guide cams 20 are arranged on the missile, engaging into the grooves 2 of the launching tube and being guided therein, thus imparting to the missile the desired spin when fired from the launching tube. The spin, depending upon the size of the launching tube and the type of missile, is normally of a pitch of between 2 and 15%, measured between the longitudinal axis of the tube and the spin groove.

Figure 2:
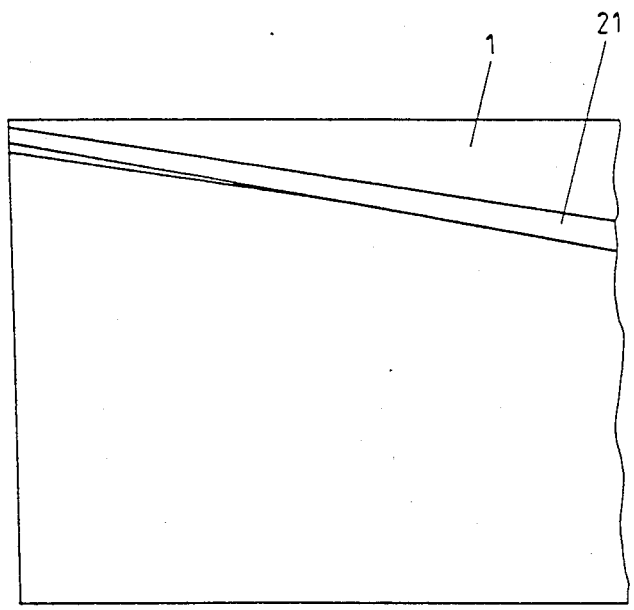
FIG. 2 shows a detail, in a longitudinal plan view, of a launching tube according to FIG. 1.
Figure 3:
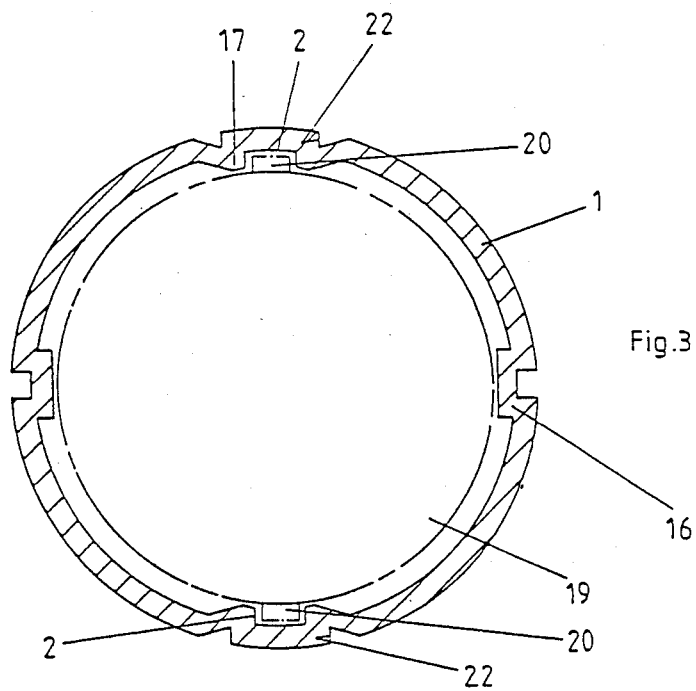
FIGS. 3–8 and 18 show other embodiments of the launching tube in cross-sectional views.

FIG. 2 shows, in a detail, a plan view of the launching tube 1 of FIG. 1 seen in a longitudinal extension, wherein the slightly twisted route of the ribs 21 can be seen on the outside of the tube.

FIGS. 3-8 and 18 show other possible embodiments of the launching tube of this invention, made of glass-reinforced thermoplastic synthetic resin by an extrusion method. In the embodiments of FIGS. 3-8 and 18, the launching tube is fashioned on the inside with guidance means for the missile in such a way that a relatively large gap remains between the inner diameter of the launching tube and the outer diameter of the missile. This is done, for example, according to FIG. 3 by forming the groove 2 on the inside of the launching tube for guiding the guide cams 20 of the missile 19 between two projecting ridges 17 created by a corresponding molded portion 22 on the outside of the launching tube. Furthermore, additional inner guide ridges 16 can be provided on the inside of the launching tube for the guidance of the missile.

Figure 4:
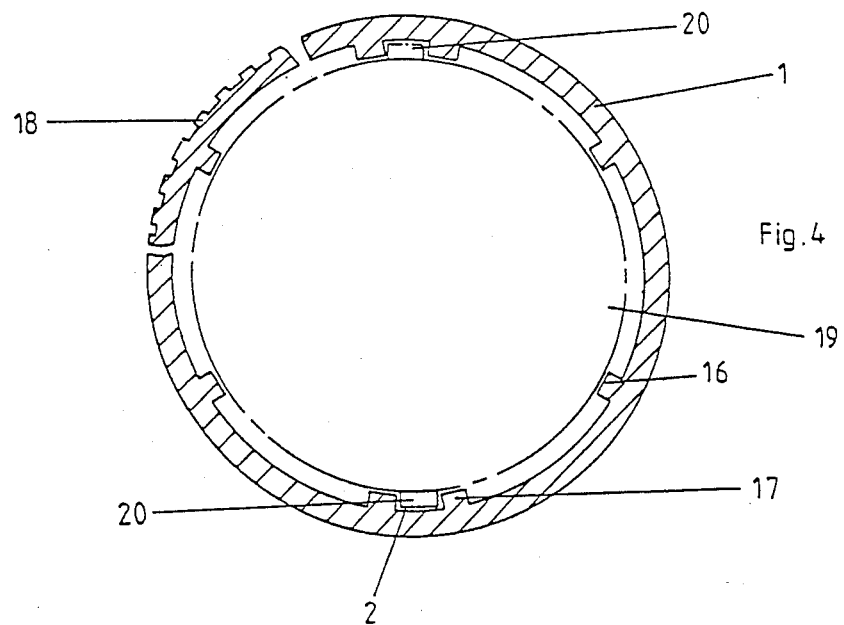

FIG. 4 shows another embodiment of a launching tube 1 which can be provided on the outside, for example, with profiling 18, in order to be able to apply a wrapping material to the tube to reinforce the tube. The profiling 18 also extends helically about the axis of the tube. On the inside, the launching tube is equipped with paired guide ridges 17 forming therebetween the groove 2 wherein the guide cam of the missile 19 is guided. The guide ridges 17 extend helically and thus impart the desired spin to the missile. Additionally, other projecting ridges 16 are provided, distributed over the circumference, on the inside of the launching tube which can serve for additional tasks of guiding the missile.

Figure 5:
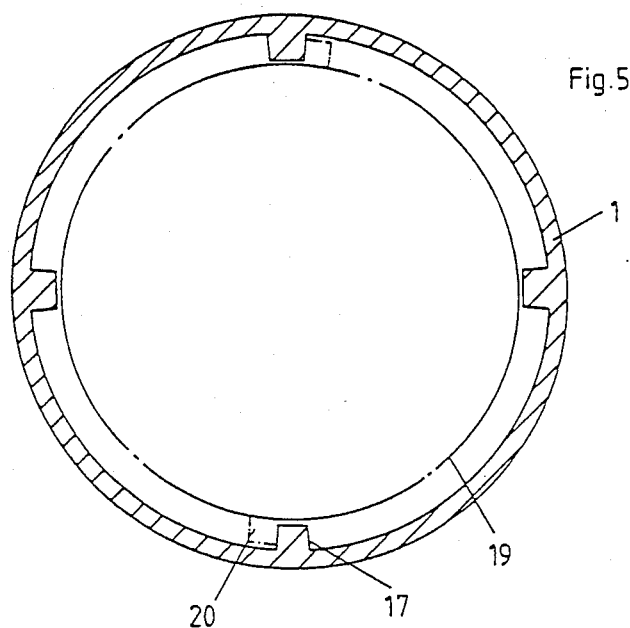

FIG. 5 illustrates a launching tube 1 exhibiting inwardly four projecting guide ridges 17. In this connection, the provision is made that the missile 19 contacts, with the guide cams 20, unilaterally the guide ridges 17; in the illustrated example, the missile is in this way provided with a right-handed spin.

Figure 6:
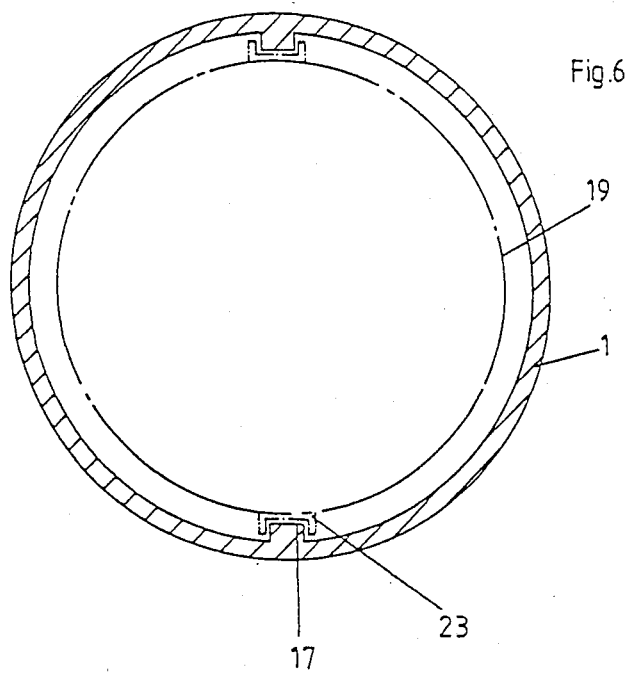

FIG. 6 shows another possibility for guiding the missile in the launching tube of this invention wherein the missile is fashioned with a U-shaped guide means 23 encompassing the guide ridges 17 of the launching tube.

Figure 18:
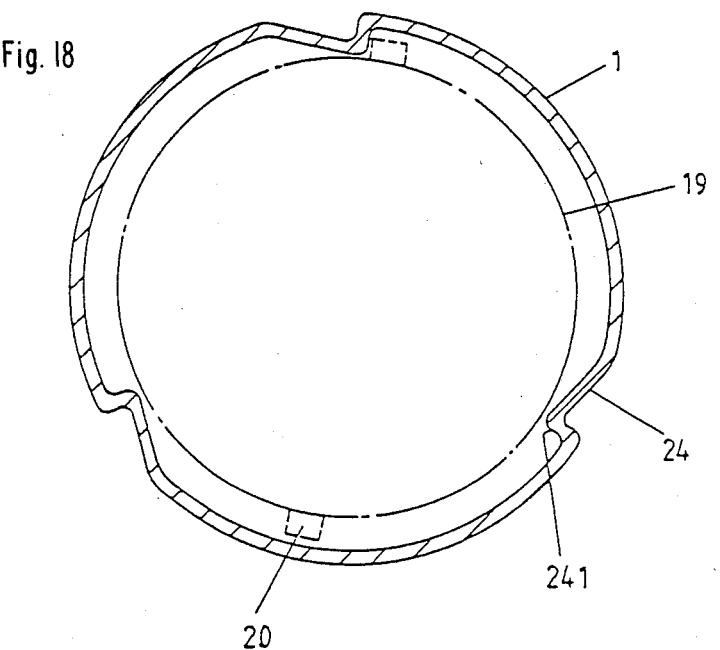

FIG. 7 shows a further possibility for fashioning the launching tube 1 with guide ridges 24 molded in the form of crimps, the guide cams 20 of the missile 19 likewise contacting the surface 241 of the integrally molded crimps only on one side, thus obtaining guidance and right-handed spin. FIG. 18 shows, as a modification, only three crimps distributed over the circumference of the launching tube 1, the missile 19 being guided with two guide cams 20 to be in contact with only one guide surface 241.

Figure 8:
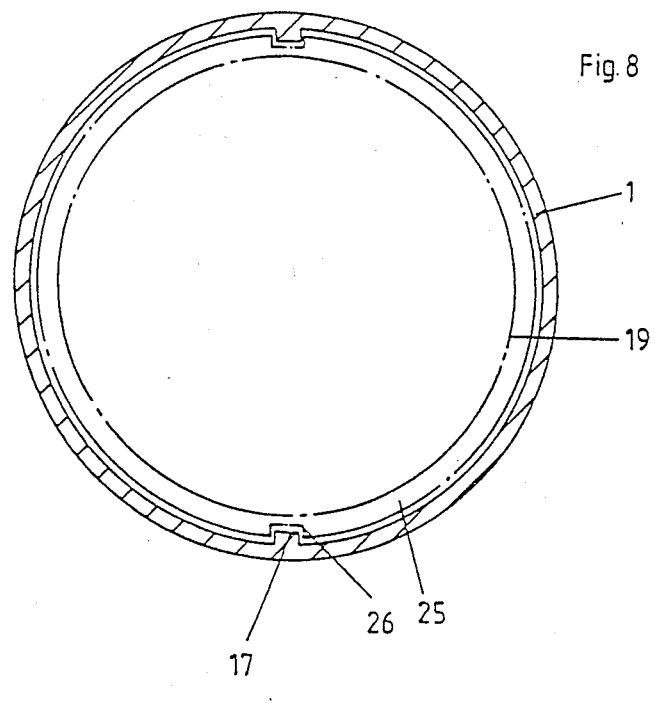

In the embodiment of FIG. 8, the launching tube 1 is fashioned with mutually opposed guide ridges 17 on the inside. The missile 19 in this case exhibits a guide ring 25 attached to the missile, wherein grooves 26 are provided which extend around the guide ridges 17.

By the construction of the launching tube from glass-reinforced thermoplastics in accordance with this invention, the dimensional ridigity and strength required for such launching tubes is attained and/or increased, and at the same time the possibility is provided to produce such launching tubes continuously by the extrusion method.

In principle, a conventional extrusion technique using synthetic resins which are nonreinforced or reinforced for solid or hollow profiles is utilized as the extrusion method, and some aspects of the conventional sizing techniques are employed, as they are disclosed, for example, in the monograph by Dipl.-Ing. Schiedrum, *Kalibrieren und Kühlen von Rohren* [*Sizing and Cooling of Pipes*] in *Plastverarbeiter* [*Plastics Processor*] 30th year (1979 No. 6, pages 321-328).

In the extrusion technique for synthetic resins of the nonreinforced or fiber-reinforced type, the mode of operation in case of solid or hollow profiles, for example, pipes or profiled pipes, is such that the profiled rod extruded by the extruder through an extrusion die is pulled through an external sizing tool. In this procedure, the profiled rods are urged by external vacuum within the sizing tool or internal excess pressure against the wall of the sizing tool and during this operation are cooled from the outside and optionally also from the inside. In conventional sizing techniques, the composition flows straight ahead within the extrusion die, ie.e, in parallel to the longitudinal axis. The direction in parallel to the longitudinal axis is also retained in the sizing tool, be it a profile, a pipe, or a profiled pipe. In other words, the product has a cylindrical shape after exiting from the sizing tool and cooling. This means that all edges, lugs, or grooves extend in parallel to the longitudinal axis.

It has now been discovered according to this invention that it is possible to impart an axially extending twist to a synthetic resin composition extruded from an extrusion die with contours extending in parallel to the longitudinal axis and thus flowing in parallel to the axis, if the sizing contours of the sizing tool are provided a corresponding twist, which is imparted to the extrudant.

Figure 13:
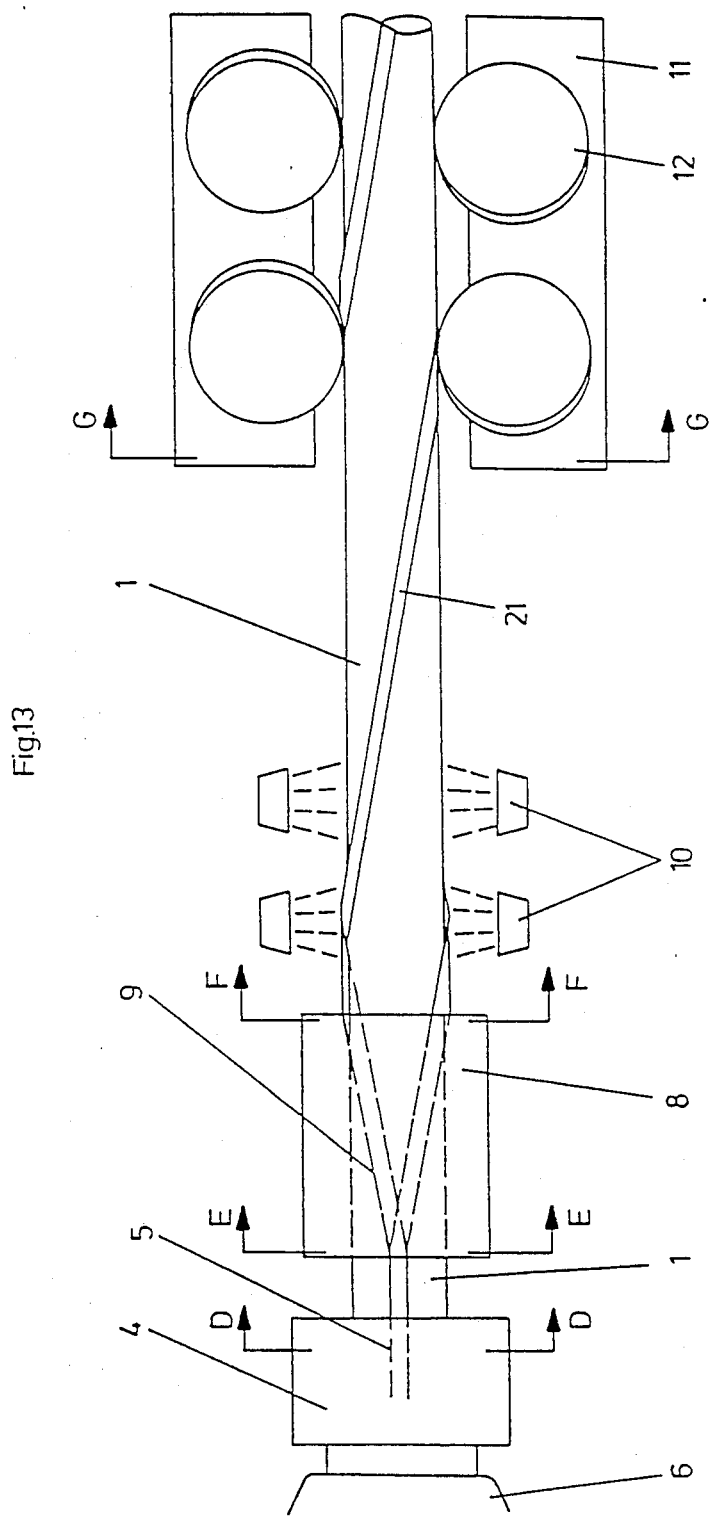
FIG. 13 shows an extrusion arrangement with means for providing external sizing in a schematic view.
Figure 14:
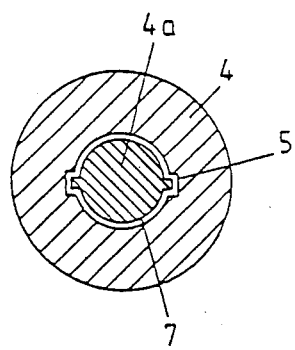
FIG. 14 shows a section taken along line D—D according to FIG. 13.
Figure 15:
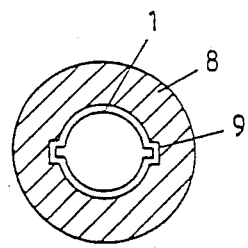
FIG. 15 shows a section taken along line E—E according to FIG. 13.
Figure 16:
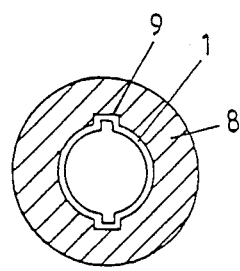
FIG. 16 shows a section taken along line F—F according to FIG. 13.
Figure 17:
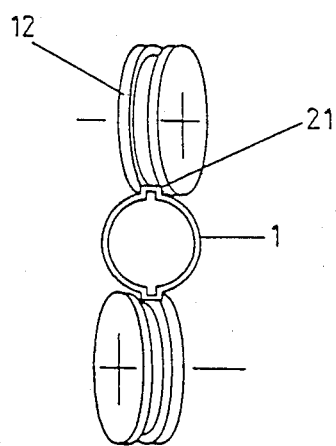
FIG. 17 shows a section taken along line G—G according to FIG. 13.

FIG. 13 shows a schematic view, in toto, of an arrangement for manufacturing the launching tube 1. The extruder 6 extrudes the rod of thermoplastic material axially from the die 4, which die has, in parallel to the longitudinal axis, grooves 5 for forming the ribs 21. This rod then immediately enters a sizing tool 8. In the tool 8, the grooves 9 are provided with a twist for reorientating the ribs 21. The composition, still in the plastic condition, then flows, in spite of its axially running exit from the die 4, in a twisted direction with respect to the longitudinal axis, following the grooves 9 of the sizing tool 8. This applied to the entire cross section of the launching tube 1. The thus-sized and extensively cooled launching tube 1 then exits from the sizing tool 8 while revolving in accordance with the pitch of the sizing tool grooves. Consequently, the launching tube 1 must be taken off in a revolving condition. It is advantageous to provide also within the launching tube a sizing mandrel in the sizing tool for the internal sizing of the launching tube 1 and grooves 2, but only a partial sizing step is carried out here, i.e., only those areas of the inner walls or surfaces are sized which take over a guiding function. This operation is followed by additional cooling means 10 with the aid of a special roller take-off means 11 that follows the revolving motion of the tube on account of its construction. In this case, take-off rollers 12 are arranged in pairs, which engage adjacent to the ribs 21. Other arrangements are also possible in this connection. The spacing of the take-off site from the outlet of the sizing tool is determined by the inclination of the twist imparted to the launching tube 1. FIGS. 14–17 show details of the arrangement shown in FIG. 13.

Thus, in a sizing tool 8 of the aforedescribed type, each point of the launching tube surface moves along the sizing tool wall in an axial as well as a circumferential direction. The wall friction forces then act correspondingly in opposition in these two directions. It has been found that a tube of thermoplastic synthetic resin entering the sizing tool 8 while still in the thermoplastic condition also overcomes the frictional forces in the circumferential direction and exits with a spin from the sizing tool.

The launching tubes illustrated in FIGS. 1–8 can also be sized and cooled by means of a sizing mandrel arranged within the launching tube. FIG. 9 shows the sizing arrangement. The extruder 6 urges the fiber glass/resin material through the die 4, which die has axially extending grooves 5 for the ribs 21 or projecting grooves for the ridges 16, 17, 24 of the launching tube 1. The sizing mandrel 13 is cooled and under vacuum. An additional external cooling means 10 is likewise provided. The sizing mandrel 13 is attached to the die 4 with thermal insulation. The sizing mandrel 13 has, on the die side, a continuously extending recess 14 in communication with the outside air via a duct or the like and thus preventing the buildup of a vacuum.

This extrusion method makes it possible to manufacture even profiles with a spin twist which are, for example, of a rectangular form, open profiles, etc., which thus deviate from the preferred, approximately circular cross sections according to FIGS. 1–8 and 18.

FIGS. 10–12 show sections A—A, B—B, C—C of FIG. 9 in a schematic illustration, with the grooves extending in a twisted fashion along the sizing mandrel 13. In the zone of the die 4, the grooves 5 extend linearly; the die mandrel 4a is shown in the interior.

Since as mentioned above, friction forces acting in the circumferential direction are also produced between the surface of the launching tube and the surface of the sizing mandrel, it may be advantageous to apply a lubricant to the launching tube to be manufacture, especially in case of relatively small angles of inclination of the spin grooves or spin ridges. This can be done either shortly in front of the sizing mandrel or also as early as within the extrusion die.

It is possible according to this invention to process customary thermoplastic materials, such as, for example, nonplasticized PVC. However, for reasons of strength consideration, fiber-reinforced synthetic resins are preferred, such as, for example, glass-reinforced polyamide. It is also possible to additionally coat these fiber-reinforced cross sections, produced with a twist, in the same extrusion procedure with nonreinforced synthetic resin on the inside as well as on the outside, or on both sides.

For reasons of strength, it can be necessary for certain cases to provide these rifled launching tubes on the outside additionally with a further reinforcement material.

In the extrusion of thermoplastic compositions according to the above-described mode of operation, the synthetic resin, preferably reinforced with glass fibers, flows, coming from the axial direction, into a sizing means with spin grooves or spin ridges and is here provided with the required spin by the grooves or ridges, and solidifies into a solid pipe by cooling. If this aforedescribed principle is applied to strips with resin-impregnated glass roving knitted from glass fibers, etc., then here, too, the material enters the sizing tool. This sizing tool, in correspondence with the pultrusion technique, needs an additional internal caliber in this case. As contrasted to thermoplastic compositions with cooling of the sizing tool, the sizing tool is here temperature-controlled according to this process, and thereby the synthetic resin is made to crosslink and solidify. The result here, too, is a tubular member with rifling-like grooves or ridges as shown, for example, in FIGS. 1–8 and 18. This also requires a rotating take-off process, as in case of the thermoplastic products. The only difference resides in that the thermoplastic is solidified by cooling, and the thermosetting resin is solidified by heating in the sizing tool. Here again, a further reinforcement of the rifled tube can be provided by subsequent wrapping of, for example, resin-impregnated glass fibers.

While we have shown and described several embodiment in accordance with the present invention, it is understood that the same is not limited thereto but is susceptible of numerous changes and modifications as known to one having ordinary skill in the art and we therefore do not wish to be limited to the details shown and described herein, but intend to cover all such modifications as are encompassed by the scope of the appended claims.

EXAMPLES AND TABLE 1

In order to produce the PVC-containing composition for the extrusion of the launching tube, the components are mixed in dry, powdery form and plasticized; this composition is used to extrude panels having a thickness of about 4 mm and a width of 500 mm with the aid of, for example, a single-screw extruder or cascade extruder or twin screw-extruder. For purpose of extrusion, a plasticizing temperature is required in the barrel of 160°–190° C. with a die temperature of 195° C.

The components of the composition according to the examples, are expressed in parts by weight; a suspension PVC having a K value of 64 or 57 is utilized. The various modifiers employed in Examples are characterized by their abbreviations, CPE means chlorinated polyetylene, EVA means ethylene vinyl acetate.

The properties are measured on the extruded panels; these properties are anyloguous to pipes. The modulus of elasticity is determined, according to DIN (German Industrial Standard) 53457; the notched impact strength according to Izod FT-LOS/IN; the tensile stress at break according to DIN 53455; the elongation at break according to DIN 53455, and the deflection temperature under load, method A, in °C. according to ISO R 75.

Added FIG. 19 shows a schematic view of the launching tube FIG. 1 and FIG. 20 of the lauching tube FIG. 7.

TABLE 1

| Examples | 1 | 2 | 3 | 4 | 5 |
|---|---|---|---|---|---|
| S PVC, K Value 64 (57) | 100 (K 57) | 100 (K 57) | (K 57) | 80 | 100 (K 57) |
| Stabilizer Mixture | 4 | 4 | 4 | 3 | 4 |
| Modifier | 10 (EVA) | 10 (EVA) | 10 (EVA) | 20 CPE | 10 (EVA) |
| Glass Fibers, Length 6 mm, $\phi$ 10 $\mu$m | 70 | 80 | 100 | 50 | 50 |
| CaCO$_3$ (Average Particle $\phi$ <10 $\mu$m) | 5 | 5 | 5 | — | 5 |
| 1,2-Hydroxystearic Acid | 0.2 | 0.3 | 0.4 | 0.3 | 0.2 |
| Oxidized PE Wax | — | — | — | 0.5 | — |
| Ca Stearate | 1.0 | 1.0 | 1.0 | 1.0 | 1.0 |
| C 16/18 Wax Esters/Epox. Soybean | 3 | 3.5 | 3.8 | 1.3 | 3 |
| Modulus of Elasticity N/mm$^2$ at 23° C., | | | | | |
| transverse | 4,860 | 4,880 | 5,870 | 3,580 | 4,230 |
| longitudinal | 12,730 | 15,560 | 20,670 | 10,480 | 10,790 |
| Impact Resistance (Notched) (Izod) J/m | | | | | |
| transverse | 39 | 39 | 53 | 69 | 37 |
| longitudinal | 80 | 59 | 72 | 133 | 69 |
| Tensile Stress at Break N/mm$^2$ | | | | | |
| transverse | 28.4 | 21.3 | 20.7 | 24.6 | 33.9 |
| longitudinal | 88.6 | 75.7 | 66.6 | 64.6 | 83.8 |
| Elongation at Break, % | | | | | |
| transverse | 2 | 2 | 2 | 2 | 2 |
| longitudinal | 2 | 2 | 2 | 2 | 2 |
| Deflection Temperature under Load in °C., Method A ISO/R 75 | | | | | |
| transverse | 66 | 69 | 66 | 72 | 68 |
| longitudinal | 75 | 77 | 76 | 77 | 72 |

What is claimed is:

1. A process for the manufacture of a launching tube for missiles comprising a tubular element having guidance means on the inside for imparting spin to a missile fired from said tubular element, which comprises extruding a fiber-reinforced thermoplastic molding composition through an extrusion die to produce a tubular preform having a flow direction, a longitudinal axis and having at least one guide element located on an inside wall; said at least one guide element extending in parallel to the flow direction and to the longitudinal axis of the tubular preform within said extrusion die and exiting from said die in parallel to the longitudinal axis; and sizing the preform by passing the preform through a fixed sizing device having contact surfaces that shape and calibrate the preform into the tubular element having said guidance means on the inside, said sizing device imparting an axial twist to the preform as the preform passes through the sizing device to provide the at least one guide element with a helical configuration extending along the longitudinal axis of the tubular element, thereby forming said guidance means; the thus-sized tubular element leaving the sizing device with rotation corresponding to the axial twist imparted to said preform.

2. The process according to claim 1, wherein a lubricant is applied to either the inner or outer surfaces, or to both surfaces, of the preform either shortly before sizing the preform or during extrusion of the tubular preform within said extrusion die.

3. The process according to claim 2, wherein the sizing device is provided with a wall which sizes an outer surface of the preform and which exhibits at least one element for guiding the preform and for producing the helical configuration of the at least one guide element.

4. A process according to claim 1, wherein the sizing device which sizes an inner surface of the preform comprises a sizing mandrel having at least one element for guiding the preform and for producing the helical configuration of the at least one guide element within said tubular element.

5. The process according to claim 1, wherein the at least one guide element is provided with an helically extending configuration formed during sizing of the preform while said preform is in a thermoelastic condition.

6. The process according to claim 1, wherein said fiber-reinforced thermoplastic molding composition comprises a thermoplastic synthetic resin and 10 to 150 parts by weight of glass fibers per 100 partts by weight of said thermoplastic synthetic resin.

7. The process according to claim 1, wherein the thermoplastic of said fiber-reinforced thermoplastic molding composition is a synthetic resin selected from the group consisting of nonplasticized PVC, polyolefin, ethylene copolymer, propylene and propylene copolymer, polyamide, polybutene, polyvinylidene fluoride, polyvinyl fluoride, polytetrafluoroethylene, ethylene-tetrafluoroethylene copolymer, acrylonitrile/butadiene/styrene resin, styrene/acrylonitrile resin, polyphenylene oxide, polyphenylene sulfide, polyoxymethylene, polycarbonate, polyethylene terephthalate and polybutylene terephthalate.

8. The process according to claim 1, wherein the fiber-reinforced thermoplastic molding composition comprises a thermoplastic synthetic resin and 30 to 100 parts by weight of glass fibers per 100 parts by weight of said thermoplastic synthetic resin.

9. The process according to claim 1, wherein said fiber-reinforced thermoplastic molding composition contains discreet fibers, said discreet fibers being arranged in a helical orientation within the tubular element that corresponds to the axial twist imparted to the preform and to the helical configuration of said at least one guide element forming said guidance means.

10. The process according to claim 1, wherein the at least one guide element comprises a plurality of grooves formed on the inside wall of the preform.

11. The process according to claim 1, wherein the at least one guide element comprises a plurality of ribs formed on the inside wall of the preform.

* * * * *